United States Patent [19]

Coote

[11] E Patent Number: Re. 33,645

[45] Reissued Date of Patent: Jul. 23, 1991

[54] FOLDABLE MACHINIST'S TOOL TRAY

[76] Inventor: David J. Coote, 50 Lorne Street, St. Catharines, Ontario, Canada, L2P 3C4

[21] Appl. No.: 346,928

[22] Filed: May 3, 1989

Related U.S. Patent Documents

Reissue of:

[64] Patent No.: 4,728,065
Issued: Mar. 1, 1988
Appl. No.: 83,316
Filed: Aug. 10, 1987

[51] Int. Cl.[5] ..... A47K 1/04

[52] U.S. Cl. ..... 248/129; 211/70.6; 248/150

[58] Field of Search ..... 248/129, 166, 188.6, 248/150, 125; 280/79.2, 639, 38, 47.26; 211/70.6, 13, 131, 133; 108/27

[56] References Cited

U.S. PATENT DOCUMENTS

| | | | |
|---|---|---|---|
| 1,158,710 | 11/1915 | Nauts | 280/38 |
| 2,492,002 | 12/1949 | Paddock | 248/129 X |
| 2,565,820 | 8/1951 | Machanic | 280/38 |
| 2,890,891 | 6/1959 | Eurey | 248/129 X |
| 3,435,956 | 4/1969 | Ulitsch | 211/70.6 |
| 3,937,485 | 2/1976 | Shourek | 280/639 X |
| 4,119,044 | 10/1978 | Hines | 108/27 |
| 4,326,731 | 4/1982 | Woychio | 280/639 X |
| 4,471,969 | 9/1984 | Zabala | 280/639 X |

FOREIGN PATENT DOCUMENTS

| | | | |
|---|---|---|---|
| 529239 | 8/1956 | Canada | 248/125 |
| 346928 | 5/1938 | United Kingdom . | |

*Primary Examiner*—J. Franklin Foss
*Attorney, Agent, or Firm*—McConnell and Fox

[57] ABSTRACT

A foldable machinist's tool tray is provided which conveniently supports a pan over the engine compartment of an automobile, for example. When in its unfolded position the tray may be wheeled about on its wheels but is prevented from inadvertent movement by a leg which engages the floor. In its folded position the tray is still supported parallel to the floor on its wheels but at a much lower height so that it may be wheeled underneath the automobile.

5 Claims, 2 Drawing Sheets

FOLDABLE MACHINIST'S TOOL TRAY

Matter enclosed in heavy brackets [ ] appears in the original patent but forms no part of this reissue specification; matter printed in italics indicates the additions made by reissue.

FIELD OF THE INVENTION

This invention relates to machinists' tool trays and, in particular, to portable, foldable trays.

DESCRIPTION OF THE PRIOR ART

Numerous machinists' tool trays have been proposed in the past. Some such trays consist of a tray and removable legs or stand which permit the tray to be disassembled for transportation and then reassembled on site. Other trays may be provided with foldable legs which reduces their size for carrying. Some of such prior art trays may be designed for use in situations similar to automotive repair situations where it is desirable that the support for the tray should extend underneath the vehicle while the pan for carrying the tools projects over the top of the engine compartment similar to the overbed table shown in Canadian Patent 702,246 issued Jan. 19, 1965.

SUMMARY OF THE INVENTION

In accordance with the present invention, a machinist's tool tray is provided which supports the tools in a pan an adjustable height above the ground or a plane surface in a manner which permits the pan to project over the work and the support member to project under the work as in the case of automotive repair, with a support member which is provided with wheels and also stop means to ensure the bench will not move inadvertently. In addition, the support means and the pan may be folded together in such a way as to permit the tray to be used when folded or unfolded thus providing a tray of selectable height and, in addition, when folded permitting the tray to be conveniently lifted or moved as a compact structure.

A clearer understanding of my invention may be had from a consideration of the following description of the preferred embodiment together with the drawings in which.

DESCRIPTION OF THE PREFERRED EMBODIMENT

Figure 1:
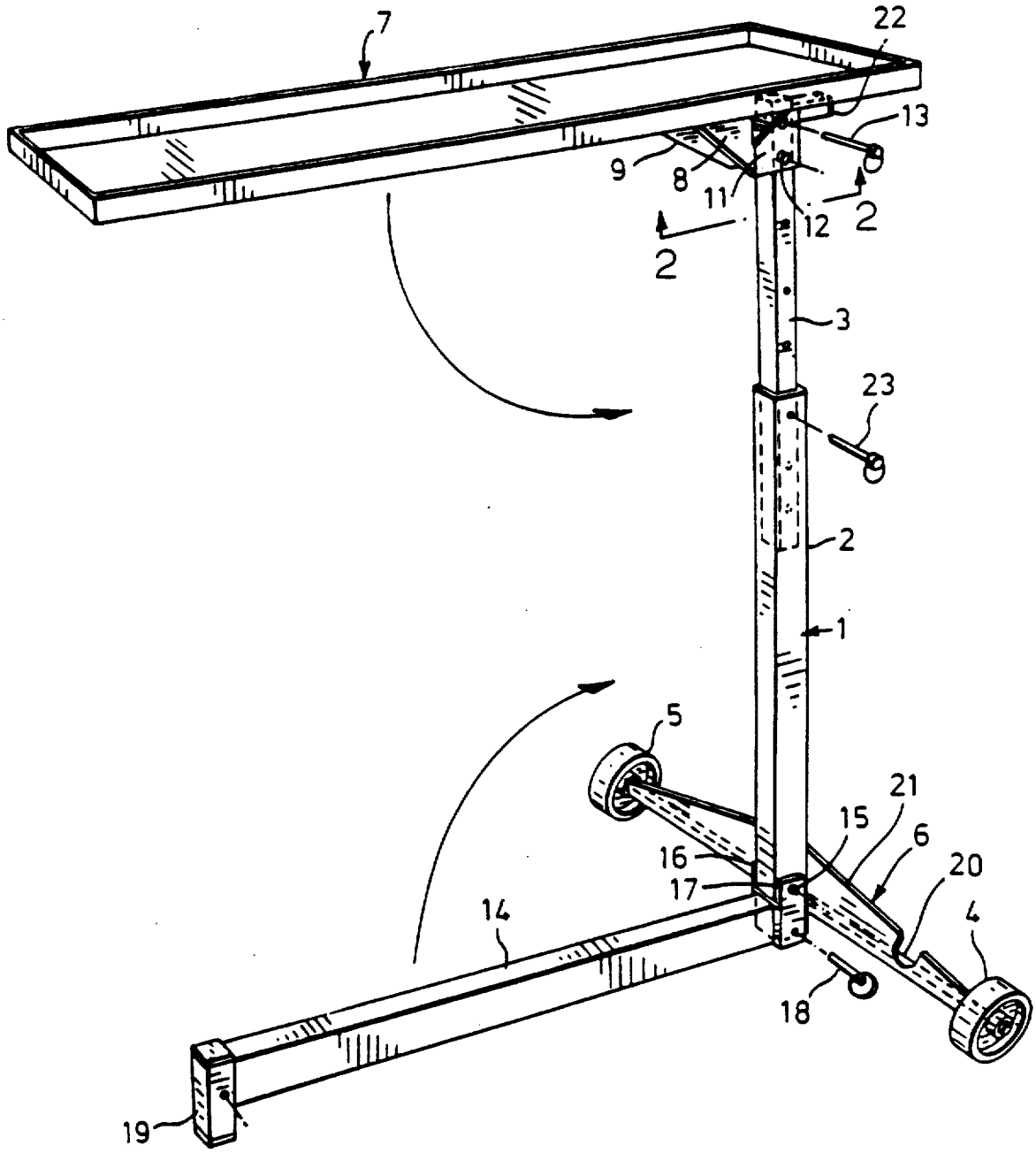
FIG. 1 is a perspective view of the tray in accordance with my invention in its erected position.
Figure 2:
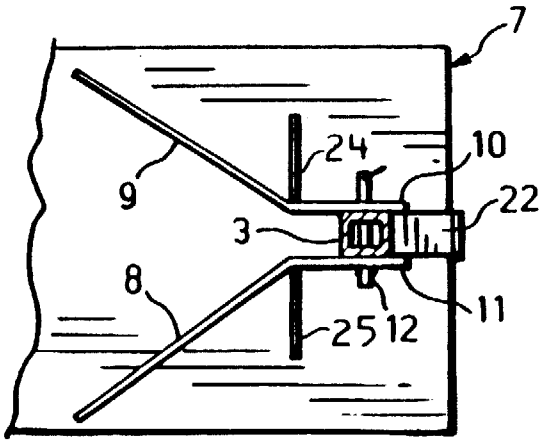
FIG. 2 is a sectional plan view of the tray along section lines 2—2 in FIG. 1.

Considering first FIG. 1, there is shown a perspective view of my invention. As will be seen, a vertical leg 1 is formed from a rectangular tube of suitable cross-section. The lower portion 2 of leg 1 is welded to a transverse axle 6 which included both the rod 20 of circular cross-section, and a web 21 welded to the rod 20 and to the vertical section 2 providing additional rigidity to the rod 20 and bracing for the leg 1. The upper portion of leg 1 comprises the section 3 which is also of rectangular cross-section and otherwise corresponds to section 2 except that it fits slidably within the interior of section 2. The pan 7 is pivotably mounted on section 3 of leg 1 by means of a pair of brackets 8 and 9, more clearly shown in FIG. 2. These brackets are mounted perpendicular to the pan 7. Brackets 8 and 9 comprise a pair of parallel sections 10 and 11 which are spaced apart a sufficient distance to snugly receive section 3 which is pivotly mounted in the brackets by means of a pivot pin 12. Each of the brackets 8 and 9 has an extension piece which fans out from the parallel section. The pan 7 is firmly attached to both the parallel sections and the fanned out extensions thus stabilizing the tray with respect to section 3. Additional brackets 24 & 25 may be used to provide additional stability to the pan by firmly attaching them between brackets 8 & 9 & the pan 7 if required. The pan 7 may be located in a position at right angles to section 3 by means of a removable pin 13 which passes through the brackets 8 and 9 and through the end of section 3.

A second leg 14 is pivotably mounted at the lower end of leg 1 by means of a pair of brackets 16 and 17 which are fixed to the end of leg 14 and snugly engage the sides of leg 1 and are pivoted thereon by a pin 15 which passes through the brackets 16 and 17. A removable pin 18, when passed through brackets 16 and 17 and through a hole in the lower end of leg 1, maintains leg 14 at right angles to leg 1.

At the other end of leg 14 a short leg designated 19 extends downwards. Mounted on the other side of leg 1 from leg 14 is the axle 6, which includes web 2 and rod 20, is fixed to the outer lower end of section 2 of leg 1. At each end of the axle 6 are mounted the wheels 4 and 5. On the same side of leg 1 and at the upper end of section 3 is a further leg 22 which extends outward from section 3 on the same side as axle 6.

As illustrated, it will be seen that pan 7 is maintained substantially parallel to arm 14. The bench may be conveniently moved by lifting upwards on the outer end of pan 7 which lifts leg 19 off the ground and permits the bench to be moved on wheels 4 and 5. When leg 19 is placed on the ground, however, the bench is stable and restrained from movement on the wheels thus ensuring it is not inadvertently moved when objects are placed on the pan or removed from the pan.

It will also be seen that section 3 may be moved up or down relative to section 2 by removing pin 23 which passes through holes in section 2 and section 3. The bench may therefore be adjusted to the desired height by removing the pin 23 and lifting the pan 7 to the desired height and once more inserting the pin 23 through suitably located holes in sections 2 and 3 of leg 1.

Figure 3:
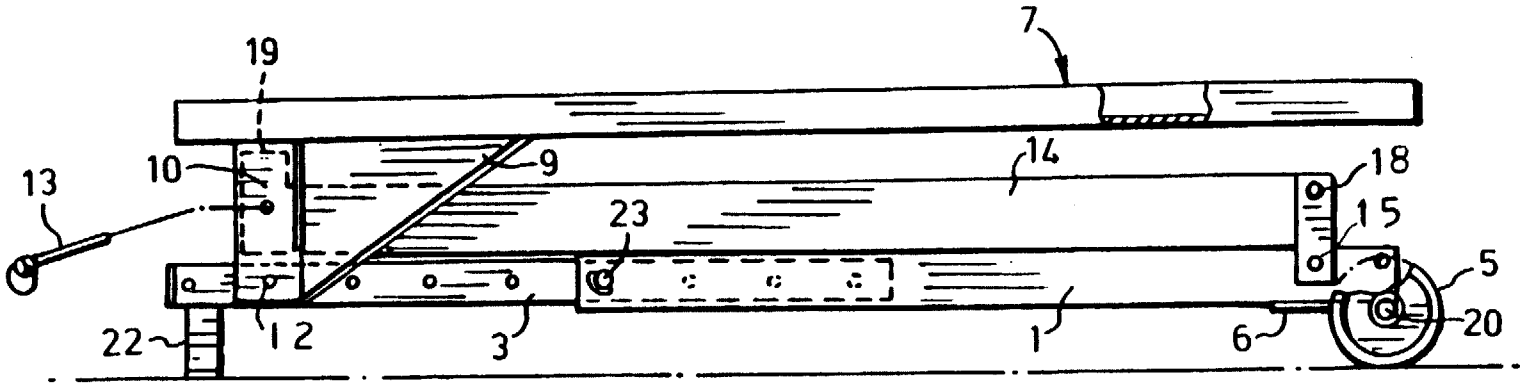
FIG. 3 is a view of the tray in its folded position.

The bench may be folded, as shown in FIG. 3, by first placing tray 7 in a vertical position with leg 22 on the ground. In this position, the bench is supported on wheels 4 and 5 and leg 22. Pin 18 may now be removed permitting leg 14 to be rotated on pivot pin 15 until leg 14 is substantially parallel with leg 1. Pin 13 is now removed permitting the pan 7 to rotate on pivot 12 until the pan 7 is also parallel with leg 1. Pin 13 may now be replaced through the holes in brackets 8 and 9 and the hole in leg 19 retaining leg 14 and pan 7 parallel to leg 1. In its folded position the tray may now be used in situations where a tray is required of minimal height, for example, where a mechanic is working on the lower side of the vehicle and the tray has to be located under the vehicle. It will be seen by virtue of the wheels 4 and 5 and the leg 22 that the pan is maintained parallel with the ground and may be wheeled about by lifting the leg 22 and rolling the tray on wheels 4 and 5, however, when leg 22 engages the ground, the tray is relatively stably positioned. It will also be seen that in its folded position the tray may be conveniently lifted by placing the pan in the vertical position with leg 22 at the top, leg 22 and section 3 forming a convenient carrying handle. The tray may also be conveniently wheeled about in the folded position by grasping leg 22 and maneuvering the tray on wheels 4 and 5 with the pan substantially vertical.

To unfold the tray the tray is placed in the position shown in FIG. 3 pin 13 is removed and the pan 7 rotated about pin 12 until pan 7 is vertical and its end reaches the ground. Pin 13 may then be reinserted through brackets 8 and 9 and through the hole in section 3 of leg 1. This locks pan 7 at right angles to leg 1. Pin 18 is removed and leg 14 is rotated until the holes in brackets 16 and 17 align with the hole in section 2 of leg 1 and pin 18 is reinserted. The whole assembly may now be rotated on wheels 4 and 5 until leg 19 engages the ground and pan 7 is parallel to the ground.

While the legs have been described as rectangular and shown as square in cross section they may also have other forms, such as circular, if desirable. Non-circular cross sections have the advantage of preventing inadvertant rotation of one section of leg 1 with respect to the other, but circular cross sections provide the greatest rigidity for a given weight.

I claim:

1. A machinists' tool tray comprising a pan, a first leg pivoted at its upper end adjacent one end of said pan, a second leg pivoted at its one end to the lower end of said first leg, an axle fixed transverse to said first leg at its lower end, a pair of wheels mounted on each end of said axle, first removable locking means for locking said pan at right angles to said first leg, second removeable locking means for locking said second leg at right angles to said first leg and substantially parallel to said pan and projecting from said first leg in the same direction as said pan thereby, when the tool tray is placed with the wheels on the ground and the other end of said second leg touching the ground the pan is maintained substantially parallel to the ground *wherein, when said second removeable locking means is removed, said second leg may be pivoted 90° until it is parallel to said first leg and, when said first removeable locking means is removed, said pan may be pivoted 90° about its one end until it is parallel to said first and second legs.*

[2. A tool tray as claimed in claim 1, wherein, when said second removeable locking means is removed, said second leg may be pivoted until it is parallel to said first leg and, when said first removeable locking means is removed, said pan may be pivoted about its one end until it is parallel to said first and second legs.]

3. A tool tray as claimed in claim 1 wherein[,] said first and second legs have projections at their ends furthest from said axle, said projections being substantially equal to the radius of said wheels whereby either one of said legs is maintained parallel to a flat surface when the wheels engage said flat surface and the end of said one of said legs also engages said flat surface.

4. A tool tray as claimed in claim 1 wherein said first leg is of adjustable length.

5. A machinists' tool tray comprising a pan, a pair of brackets mounted on the lower side and at one end of said pan, a first leg section pivotably mounted adjacent its upper end between said brackets, a second leg section telescopically fitted to said first leg section, a pair of wheels, one at each end of an axle mounted perpendicular and on the lower end of said second leg section, a third leg section pivotably mounted on said second leg section adjacent said axle first removable locking means for locking said pan at right angles to said first leg section, second removable locking means for locking said third leg section at right angles to said second leg section parallel to and underlying said pan, *wherein said locking means may be removed, said third leg section rotated 90° until substantially parallel to said first and second leg section then reinserted locking said third leg section parallel to said first and second leg sections and said first locking means may be removed, said pan pivoted 90° until substantially parallel to said leg sections then reinserted locking said pan parallel to said leg sections.*

[6. A tool tray as claimed in claim 5, wherein said locking means may be removed, said third leg section rotated until substantially parallel to said first and second leg section then reinserted locking said third leg section parallel to said first and second leg sections and said first locking means may be removed, said pan pivoted until substantially parallel to said leg sections then reinserted locking said pan parallel to said leg sections.]

*7. A tool tray as claimed in claim 5, wherein said first and third leg sections include projections at their ends furthest from said wheels, each projection being equal in length to the radius of said wheels whereby when one of said projections engages a flat surface and said wheels engage said surface the associated leg section is maintained parallel to said surface and said tray, in either its folded or unfolded position, may be maintained parallel to said surface with the same face of the tray exposed in both positions.*

* * * * *